Figure 1:
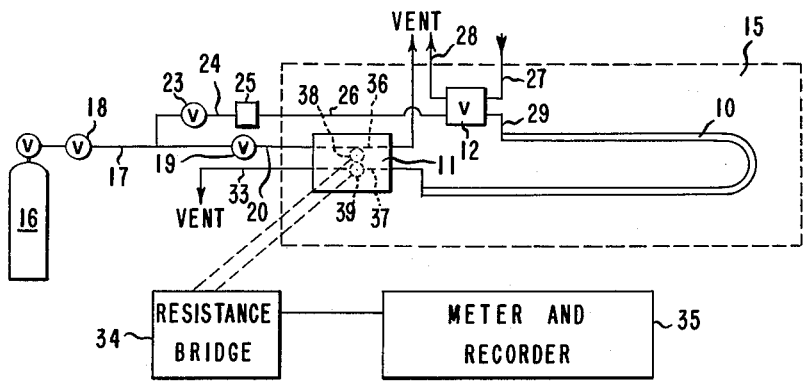

Oct. 8, 1963

R. KIESELBACH 3,106,088

SHIELDED RESISTOR

Filed April 25, 1960

2 Sheets-Sheet 1

INVENTOR
RICHARD KIESELBACH

BY  Harry J. McCauley

ATTORNEY

Oct. 8, 1963    R. KIESELBACH    3,106,088
SHIELDED RESISTOR
Filed April 25, 1960    2 Sheets-Sheet 2
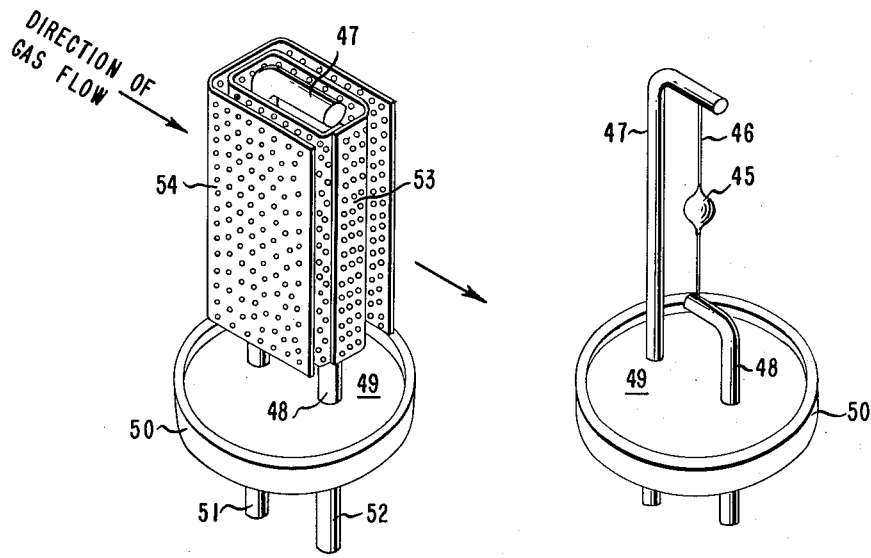
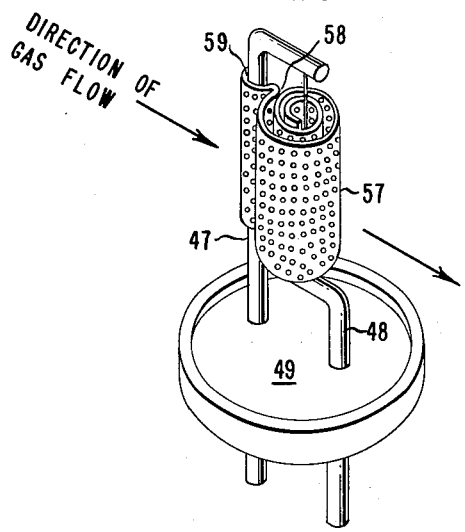
INVENTOR
RICHARD KIESELBACH
BY *Harry J. McCauley*
ATTORNEY

United States Patent Office 3,106,088
Patented Oct. 8, 1963

3,106,088
SHIELDED RESISTOR
Richard Kieselbach, West Chester, Pa., assignor to E. I.
du Pont de Nemours and Company, Wilmington, Del.,
a corporation of Delaware
Filed Apr. 25, 1960, Ser. No. 24,501
3 Claims. (Cl. 73—27)

This invention relates to a shielded electrical resistor, and particularly to a shielded resistor of the thermistor type used in gas chromatography displaying a marked variation in electrical resistivity as a function of the thermal conductivity of a gas in contact therewith.

The term "thermistor" has been coined to denote thermally sensitive electrical resistors, and particularly the class of materials which display a very large variation in resistivity with temperature. Typically, one such material is that composed of oxides of manganese and nickel, which has a temperature coefficient $\alpha$ of $-4.4\%/°$ C. at 25° C., thus giving a specific resistance ratio variation of approximately 5,000 to 1 over the temperature range $-60$ to 200° C. as compared with platinum which changes by a factor of about 2 in the same range. The advantageous properties of thermistors are summarized for a number of applications in the article entitled "Thermistors as Components Open Product Design Horizons," by K. P. Dowell, which appeared in the August 1948 issue of "Electrical Manufacturing."

The characteristics of thermistors are such that they are employed in gas chromatography, a method of gas analysis which consists of measuring successive pure gaseous components as they pass in staged time sequence out of an adsorption tube within which is effected the resolution of the gas mixture into its relatively pure components, all as described in general terms in U.S. Patent 2,841,005 and elsewhere. Such gas analysis involves the time-correlated sequential measurement of gas concentrations as a function of changes in thermal conductivity of a flowing stream of a carrier gas, such as helium, containing the separated components of the mixture in analysis, as compared with the changes in thermal conductivity of the pure carrier gas under the same conditions of temperature and pressure.

It will be understood that one is working with very small gas masses in chromatography and that, accordingly, temperature measurements have to be made with extremely high sensitivity in order to achieve the quantitative analysis which is the objective sought. In fact, it is desirable to obtain sensitivities equivalent to less than one part per million in terms of gas composition, and this has not hitherto been possible, principally because of interference from the following factors: (1) sensitivity to gas flow rate variations, (2) voltage fluctuations in the electrical power supply, (3) mechanical vibration, (4) changes in the temperature of the surroundings, and (5) uncontrollable variations apparently originating in the thermistors themselves.

The shielded thermistor of this invention has been found to contribute very markedly to stability during chromatographic gas analysis and freedom from interference due to variations associated with the movements of the sample, while the electrical circuit disclosed in copending application S.N. 24,522, filed of even date herewith, confers additional benefits as regards electrical aspects and surrounding temperature fluctuations, thereby curing deleterious effects arising out of fluctuations in the electrical power supply and the like. For best results it is preferred to use the shielded thermistor of this invention in conjunction with the electrical circuit of the copending application, although each invention is completely independent of the other, because there is thereby obtained an extremely reliable chromatographic analysis apparatus.

Figure 2:
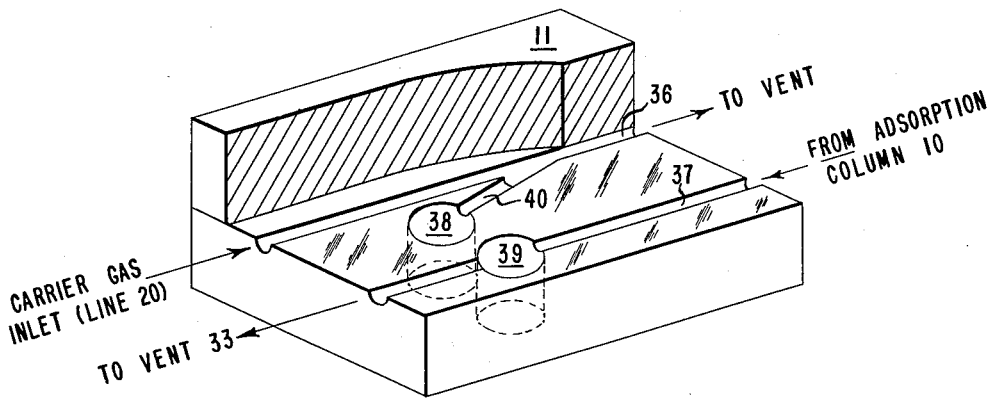

An object of this invention is to provide a shielded resistor for use in stabilizing electrical measurements of gas concentrations as a function of variation in electrical resistivity with gas thermal conductivity. Other objects of this invention are the provision of a shielded resistor particularly suited to chromatographic gas analysis, one that is low in cost and rugged in design, and one which is easy to assemble in location within the analytical cell. Other objects will become apparent from the following detailed description and the drawings, in which:

FIG. 1 is a schematic representation of one type of chromatographic analysis apparatus with which the shielded resistors of this invention are adapted for use, FIG. 2 is a view in partial section taken along the horizontal centerline of the assembled two-part thermal conductivity cell, with resistors omitted, constituting a component of the apparatus of FIG. 1, FIG. 3b is a perspective view of an unshielded thermistor showing details of support structure, FIG. 3a is a perspective view of the thermistor of FIG. 3b provided with a preferred design of shield according to this invention, and FIG. 4 is a perspective view of a thermistor such as that shown in FIG. 3b provided with a unitary spiral shield according to this invention.

Generally, this invention consists of a shielded resistor incorporating an analytical element displaying a variation in electrical resistivity as a function of the thermal conductivity of a surrounding sample gas provided with a primary solid gas flow barrier enclosing the analytical element over its full length and circumference but out of physical contact therewith and a secondary solid gas flow barrier disposed adjacent to and upstream in the direction of sample gas flow from the primary gas flow barrier, the secondary gas flow barrier extending at least through-out the full width and length of the primary gas flow barrier measured generally transverse the direction of gas flow, both of the barriers being provided with perforations small enough in size to substantially prevent flow of gas therethrough under the existing gas pressure differential but large enough and of sufficient total free area to permit substantially unimpeded diffusional passage of gas sample therethrough to the analytical element, the radial spacing between the analytical element and the primary gas flow barrier being preselected to a clearance sufficiently small to substantially completely prevent movement of gas by thermal convection within the interspace.

Referring to FIG. 1, gas chromatography utilizing thermal conductivity measurement is conveniently carried out with the system there shown schematically. The system components of large mass, such as adsorption column 10, thermal conductivity cell 11 and sample introduction valve 12 are preferably mounted closely adjacent one another within a common insulated thermostatically controlled enclosure 15 to minimize temperature variations between them. Gas tubing and electrical connections are then run beyond enclosure 15 to associated apparatus as hereinafter described.

A carrier gas, usually helium because of its chemical inertness and other desirable properties, is employed, and this is supplied from gas cylinder 16 through tubing 17 provided with pressure reducing valve 18. The helium gas is utilized as a reference and is thus introduced through bleed valve 19 and branch line 20 directly to one side of thermal conductivity cell 11 completely independent of, and out of flow communication with, the sample side of the cell. I have found that this is highly desirable, because it eliminates any flow disturbances in the reference gas stream occasioned by the downstream introduction of sample, such as occurs where the reference and sample measuring elements are in series gas path. The magnitude of such disturbances is relatively very large, the introduction of a one ml. sample in a series flow apparatus resulting typically in a noise signal of greater than one millivolt as contrasted with the less than one microvolt response of a parallel arrangement such as that described. The portion of helium utilized as carrier gas is withdrawn at a steady rate through bleed valve 23 connected to branch line 24 which discharges into a ballast chamber 25. The ballast chamber is simply a pulsation eliminator and may conveniently be a 500 ml. capacity enclosure which, in turn, is in open communication with tubing 26 running to the four-port sample introduction valve 12. Valve 12 is typically a multi-port, dual gas flow control slide valve of commercial design.

Valve 12 effects sample addition to the carrier gas, being supplied with pressurized sample gas mixture through tubing 27, any excess sample being vented through tubing 28 connected to one exit port of the valve. The other exit port is connected through tubing 29 to the inlet end of the adsorption column 10. As is conventional, column 10 is packed with a suitable solid adsorbent, or with an inert granular solid wet with a partition liquid, so that a chromatographic separation ensues within the column, under which conditions the several independent isolated gaseous components are discharged from the column at different times. These pass through the sample side of thermal conductivity cell 11 and are discharged through vent 33. By the use of a powered resistance bridge 34 including as arms the thermistors contacting both the pure helium gas as reference on one side and the helium gas plus sample on the other, as indicated schematically by broken line connections in FIG. 1, there are obtained a multiplicity of peak values of electrical current which can be measured, and recorded if desired, by meter 35. The essence of chromatography is that each electrical current peak, unique for a given component, occurs at a finite time after sample injection, which time is called the "elution time," and the areas under the peaks, each corresponding approximately to its height, are proportional to the concentration of given components in the original sample. The apparatus must be calibrated initially with known samples and under closely maintained operating conditions, since presssure and volume of sample introduced, flow rate of helium both as carrier and reference streams, and ambient temperature all affect the measurements obtained.

A preferred design of conductivity cell is detailed in FIG. 2, this being a metal block split along the horizontal centerline, wherein the reference passage reserved for pure helium gas solely is represented at 36, whereas the helium carrier plus sample passage is represented at 37. Typically, these passages are $3/16$ inch diameter. Each side is provided with a cylindrical thermistor receptacle, 38 for the reference side and 39 for the sample side closely adjacent one to another, which are shown bisected along their horizontal centerlines in FIG. 2, so that it will be understood that the complete receptacles incorporate top halves identical with the bottom halves shown. The overall dimensions of these receptacles in a typical apparatus were $1/4$ inch diameter x $3/4$ inch length. Because of the fact that the gas flow course is more direct as regards reference side 36, in that there is no ballast chamber 25 or adsorption column 10 in series connection to iron out pressure surges, it is preferred to dispose receptacle 38 to one side of 36 and limit communication therewith to a backwardly oriented passage 40, which preferably has a diameter about $1/16$ to $1/8$ inch, a length of about ten or more diameters, and is disposed at an angle of about 45° measured counter-clockwise from passage 36 when viewed from the top.

The thermistors utilized with the apparatus hereinbefore described preferably constitute a matched pair, each of which may be of the vitreous-sheathed bead type indicated at 45, FIG. 3b, mounted on a one mil diameter platinum suspension wire 46 attached to top and bottom support posts 47 and 48, respectively, which latter are preferably fabricated from "Kovar," an iron-nickel-cobalt alloy having about the same thermal expansion coefficient as glass for ease in making hermetic gas seals therewith. Posts 47 and 48 are sealed to a glass base 49 provided circumferentially with a Kovar sealing ring 50, and extend therethrough to provide terminals 51 and 52 (FIG. 3a) for connection as part of the bridge circuit 34.

The shield of this invention is shown in FIG. 3a, and comprises a primary gas flow barrier 53 in association with a secondary barrier 54, each of which is typically fabricated from 0.0035" thick perforated nickel metal. Bead 45 is preferably disposed at about midpoint of the height of barrier 53, with a length of shield extending approximately $1/8$–$3/16$ inch both above and below the thermistor bead. As shown, the primary gas flow barrier 53 is adapted to surround the associated thermistor around the complete circumference, while being out of physical contact with it. In a specific installation a primary barrier measuring $1/32$ inch in inside width, $3/16$ inch long in the direction of gas flow and $3/8$ inch in height proved completely satisfactory for the shielding of a bead thermistor measuring 0.015 inch diameter located at approximately the geometric center of the enclosure. Secondary barrier 54, which is upstream from 53, can be more restricted in extent; however, it is essential, as a minimum condition, that the secondary barrier be coextensive with the primary barrier over at least the full length and width measured transverse the gas flow path and, preferably, that it additionally enclose the full width of primary barrier 53 although being spaced therefrom a small distance, typically $1/64$ inch or less. Thus, for the specific installation described, the secondary barrier measured $1/16$ inch in inside width and $3/16$ inch in length.

Barriers 53 and 54 are preferably welded to one another and the sub-assembly welded in turn to upper support post 47 after the thermistor has been suspended between post 47 and lower support post 48. Alternatively, the barriers can simply be slipped into their respective receptacles 38 and 39 and retained by frictional contact without resorting to attachment to the supports, but this is somewhat less desirable due to the fact that relative movement between the thermistor and shield can occur as a result of shock or vibration which can alter the critical spacing hereinafter described.

My research has shown that one serious cause of instability not hereinbefore recognized appears to reside in the generation of gaseous convection currents in the region surrounding the thermistor. Without regard to the applicable theory, however, I have found that it is possible to eliminate this problem practically completely by spacing the primary barrier 53 not more than about $1/64$ inch from thermistor 45 for the extreme service conditions (e.g., cell 11 temperature of 150° C. and a flow of the heated gas therethrough of 5 cm.$^3$ per sec.), although it will be understood that a somewhat greater spacing might prove quite adequate for operations at lower ambient temperatures or gas flows. Accordingly, the general criterion for thermistor primary barrier spacing is that it be sufficiently small to substantially completely prevent movement of gas by thermal convection within the interspace between the analytical element and the barrier.

The numerical dimensions for a given shield and appurtenances depend upon the circumstances, nevertheless, it is possible to calculate the critical dimensions to at least a working approximation by application of the principles of fluid dynamics. Thus, the convective driving force is the temperature difference between the thermistor bead, heated internally by the electrical current flowing through it, and the surrounding gas and cell mass. Convection is opposed by the spacing between the thermistor bead and the first adjacent solid surface, e.g., the primary barrier 53. At the same time there are external considerations which may measurably hinder or favor convective currents, such as: (1) the orientation of the thermistor bead with respect to its surroundings, particularly as regards the existence of a flow path permitting a sequential flow upwardly past the hot bead and downwardly past relatively cooler walls, (2) receptacle and thermistor geometry, including the relationship of height to diameter which influences chimney effects, and (3) the physical properties, especially viscosity, of the gases in transit through the cell, particularly as regards helium, which is the predominant constituent. In view of the numerous variables involved, it is not possible to generalize on the numerical dimensions, and these must be settled by calculation coupled with judicious choice of alternatives for each specific case.

I have found that an equally important consideration in obtaining operational stability is the size of the perforations in the two barriers. In general, it is essential that these perforations be small enough in size to substantially prevent flow of gas therethrough under the existing gas pressure differential but large enough, and of sufficient total free area, to permit substantially unimpeded diffusional flow of gas therethrough to the analytical element. For the usual service conditions, perforations about 0.0015 inch in maximum dimension and constituting, in the aggregate, about 3.5% of substantially evenly distributed free area in each of the barriers 53 and 54 proved entirely satisfactory. It is clear that these criteria can also be varied somewhat depending upon the existing gas flows, temperature, pressure and physical properties of the gas stream, especially of the carrier gas.

Again, it is not practicable to generalize the matter of the perforations, but reliance must be had on fluid dynamics and also upon gas diffusion. The diffusion of gaseous components within the brief interval of a few hundredths of a second is readily achieved by providing perforations of appropriate size and distribution and it is not difficult to settle on an effective pattern by a combination of calculation and perhaps a few confirmatory performance tests as a check.

FIG. 4 shows a relatively simple unitary shield 57 consisting of a spiral wrap of perforated nickel metal approximately two complete turns in extent, disposed symmetrically with respect to gas flow with at least two barrier thicknesses upstream. With this shield the thermistor is disposed centrally within the spiral and, of course, out of contact therewith, and the outside opening to the spiral course closed off by a longitudinal offset 58 bent into the outer turn to bring it against the surface of the next adjacent turn, to bar gas passage therealong and restrict transit solely to the perforations. Again, it is preferred to attach the spiral shield to the thermistor support, and this is accomplished simply by welding the outer edge 59 to upper support 47 substantially as hereinbefore described for the shield of FIG. 3a.

The degree of improvement in stability of operation obtained with this invention was evaluated in a series of tests wherein a bare thermistor, such as that shown in FIG. 3b was utilized as one control. Another control was provided by utilizing the identical thermistor, except shielded by a cylinder made up of 250 mesh wire cloth of ¼ inch inside diameter and height equal to that of the shield of this invention slipped over the thermistor. Sensitivities to two types of disturbance were evaluated: (1) flow sensitivity, wherein a 1-cc. sample was inserted abruptly into the carrier gas flowing through valve 12 at a rate of about 2 cm.$^3$/sec., and (2) shock sensitivity, wherein a 60 gm. weight was dropped from a height of 15 cm. directly upon conductivity cell 11. The following sensitivities were taken to be the deflection of a recording meter 35 at a preselected gain maintained constant for all tests, using a bridge similar to that described in application S.N. 24,522, hereinbefore referred to.

The results of the tests were as follows:

|  | Flow Sensitivity | Shock Sensitivity |
| --- | --- | --- |
| 1. Bare thermistor in cell (Fig. 3b), mv | 2.5 | 1 |
| 2. Cylindrical screen-shielded thermistor, mv | 1.0 | 1 |
| 3. Shield of Fig. 3a (both thermistors shielded), mv | <0.01 | 0.03 |

It will be seen that this represents an extremely high order of improvement.

The shields hereinbefore described have been limited to those incorporating a primary and a secondary barrier, although designs using a greater number of barriers have been tested and found to be even more effective in eliminating instability. This research revealed that analytical response time lengthened appreciably with each shielding barrier added, however, so that the two-barrier construction described appears to be optimum from all standpoints.

From the foregoing, it will be understood that this invention may be modified extensively within the skill of the art without departure from the essential spirit and it is intended to be limited only within the scope of the following claims.

What is claimed is:

1. In a gas analysis thermal conductivity cell, a shielded resistor comprising in combination an analytical element disposed generally transverse the direction of sample gas flow displaying a variation in electrical resistivity as a function of the thermal conductivity of a surrounding sample gas provided with a primary solid gas flow barrier enclosing the analytical element over its full length and circumference but out of physical contact therewith and a secondary solid gas flow barrier disposed adjacent to and upstream in the direction of sample gas flow from said primary gas flow barrier, said secondary gas flow barrier extending at least throughout the full width and length of said primary gas flow barrier measured generally transverse the direction of sample gas flow, both said primary and said secondary gas flow barriers being provided with perforations small enough in size to substantially prevent flow of gas therethrough under the existing gas pressure differential but large enough and of sufficient total free area to permit substantially unimpeded diffusional passage of gas sample therethrough to the analytical element, the radial spacing between said analytical element and said primary gas flow barrier being preselected to a clearance sufficiently small to substantially completely prevent movement of gas by thermal convection within the interspace between said analytical element and said primary gas flow barrier.

2. In a gas analysis thermal conductivity cell, a shielded resistor according to claim 1 wherein said perforations are about 0.0015 inch in maximum dimension and constitute a total of about 3.5% of substantially evenly distributed free area in each of said primary and secondary solid gas flow barriers, and said radial spacing between said analytical element and said primary gas flow barrier is not more than about ¹⁄₆₄ inch.

3. In a gas analysis thermal conductivity cell, a shielded resistor according to claim 1 wherein said primary and secondary solid gas flow barriers constitute a unitary spiral wrap sealed against gas passage through the spiral course thereof provided throughout with perforations about 0.0015 inch in maximum dimension aggregating about 3.5% of substantially evenly distributed free area, and said radial spacing between said analytical element and the surface of said unitary spiral wrap adjacent thereto is not more than about 1/64 inch.

References Cited in the file of this patent

UNITED STATES PATENTS

| | | |
|---|---|---|
| 2,231,166 | Knoedler | Feb. 11, 1941 |
| 2,400,923 | Farr et al. | May 28, 1946 |
| 2,557,008 | Poole | June 12, 1951 |
| 2,868,316 | Guild | Jan. 13, 1959 |
| 2,926,520 | Schmauch | Mar. 1, 1960 |

FOREIGN PATENTS

| | | |
|---|---|---|
| 433,398 | Germany | Aug. 30, 1926 |
| 802,954 | Germany | Feb. 26, 1951 |
| 818,761 | Great Britain | Aug. 19, 1959 |